UNITED STATES PATENT OFFICE.

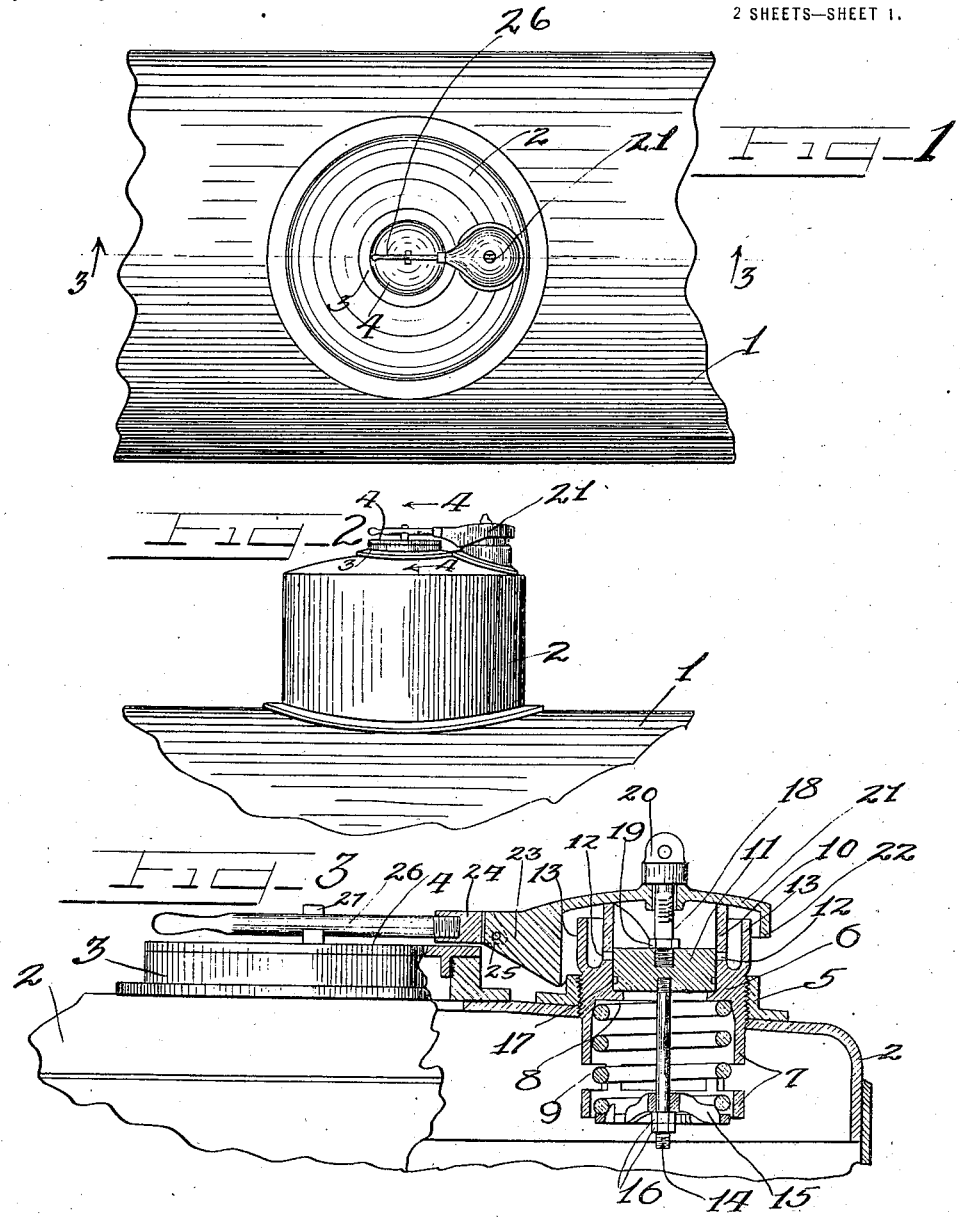

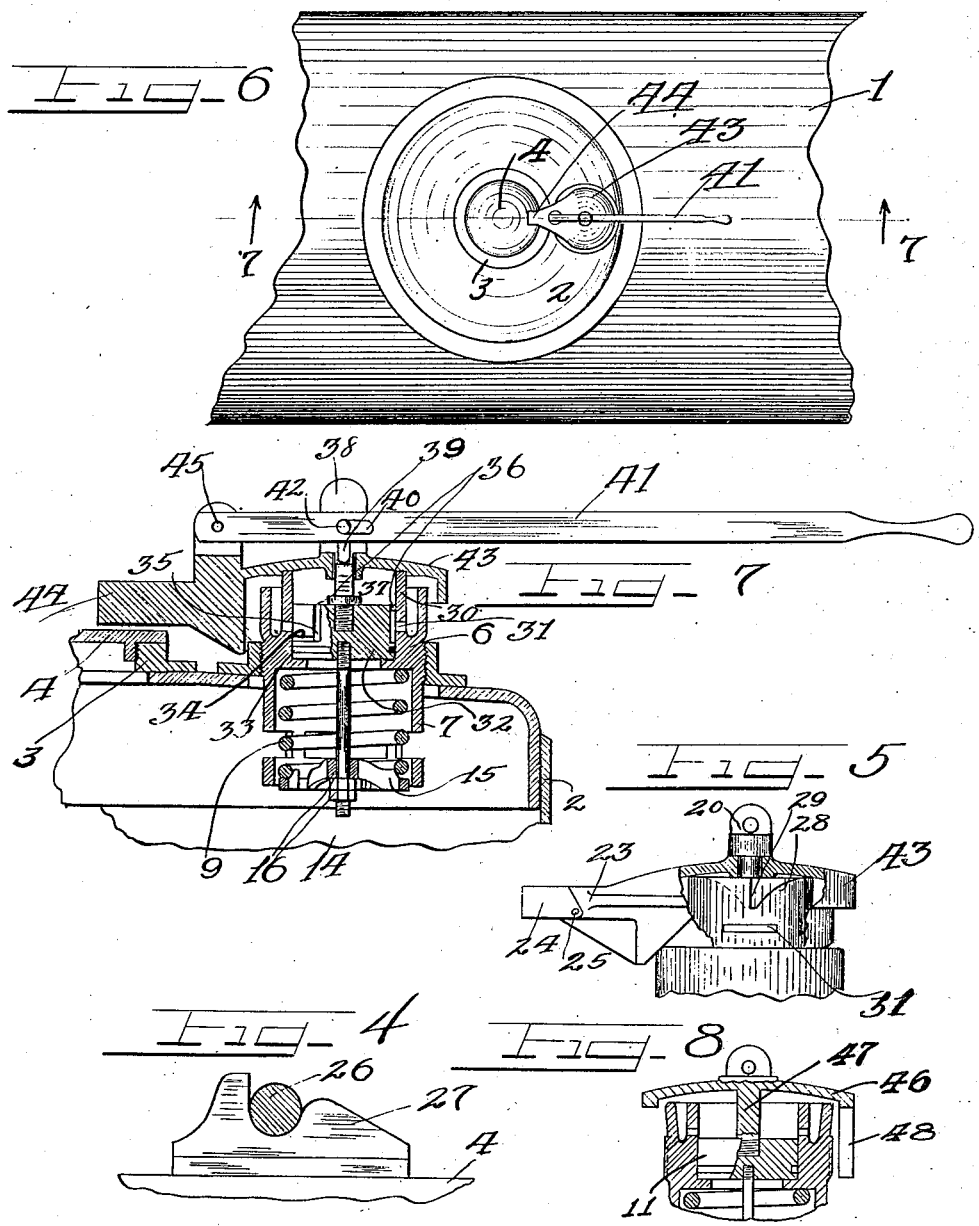

CLIFFORD LISTON BURNHAM, OF CHICAGO, ILLINOIS.

INDICATING AND MANHOLE-LOCKING SAFETY VALVE FOR TANK CARS.

1,418,530.   Specification of Letters Patent.   Patented June 6, 1922.

Application filed November 13, 1919. Serial No. 337,874.

*To all whom it may concern:*

Be it known that I, CLIFFORD LISTON BURNHAM, a citizen of the United States, and a resident of the city of Chicago, in the county of Cook and State of Illinois, have invented certain new and useful Improvements in an Indicating and Manhole-Locking Safety Valve for Tank Cars; and I do hereby declare that the following is a full, clear, and exact description of the same, reference being had to the accompanying drawings, and to the numerals of reference marked thereon, which form a part of this specification.

The general type of safety valve in use upon tank cars is of poppet design, set to open at a predetermined interior pressure within the tank car. The objections to this type of valve are that at a pressure lower than that set for opening of the valve, the valve seats loosely on its seat, permitting leakage and consequent loss of the contents of the car if of a volatile nature. The escaping gas thus becomes a serious menace to surrounding property, forming as it does a powerful explosive mixture with the air. Furthermore, there is no means provided on the valves now in use, or upon the tank car itself, to indicate the pressure, when less than release pressure, in the tank car, nor to open the safety valve and thus relieve the interior pressure in the car before the manhole is opened. Accidents, oftentimes of a serious nature, have occurred when the manhole cover is unscrewed for opening; in asmuch as before complete disconnection of the manhole cover is accomplished, the interior pressure of the tank car will blow the manhole cover out, damaging the same and possibly injuring the person manipulating the cover.

By my invention the safety valve is so designed as to not permit leakage below a predetermined relief pressure, and indicating means disclose immediately the position of the closure element of the safety valve and consequently the interior pressure in the tank car and, furthermore, opening of the manhole cannot be accomplished until the safety valve has been manually operated into locked open or relief position to insure dissipation of abnormal pressure in the tank car before detachment of the manhole cover.

It is an object, therefore, of this invention to provide a safety device for use on tank cars, reservoirs or other containers which are normally closed to contain a fluid under pressure, which operates automatically to relieve the container or reservoir of pressure above a predetermined amount and to indicate all intermediate lower pressures existent in the container or reservoir and furthermore, requiring opening of the safety valve into locked open or relief position, prior to manipulation or detachment of mechanisms giving access to the interior of the container or reservoir.

It is also an object of this invention to construct an improved type of safety valve particularly adapted for use upon tank cars or other containers for fluid under pressure which are exposed to the weather and with said device equipped with weatherproof parts to protect the same and with indicating means to indicate interior pressures in the tank car or reservoir.

It is furthermore an object of this invention to provide a safety valve for tank cars or other reservoirs in which the parts are normally unstressed, detachable as a unit from the container or reservoir, quickly, accessible and adjustable and embodying features of design and operation making the device exceedingly practical and efficient in use.

Other and further important objects of this invention will be apparent from the disclosures in the drawings and specification.

The invention (in a preferred form) is illustrated in the drawings and hereinafter more fully described.

Drawings.

Figure 1 is a fragmentary top plan view of a tank car equipped with a form of device embodying the principles of my invention.

Figure 2 is a side elevation thereof.

Figure 3 is a fragmentary view on line 3—3 of Figure 1 with parts in elevation.

Figure 4 is a sectional detail on line 4—4 of Figure 1.

Figure 5 is a fragmentary view partly broken away illustrating the upper structure of the device.

Figure 6 is a view similar to Figure 1 of a modified form of device.

Figure 7 is a fragmentary sectional detail on line 7—7 of Figure 6.

Figure 8 is a sectional detail of a modified form of device.

*Description.*

The tank car shown fragmentarily in Figures 1 and 6 is denoted as a whole by the reference numeral 1 and is provided with a dome 2 which centrally in its upper portion is provided with a manhole 3 having a detachable cover 4 which is threaded thereinto. Secured on the upper portion of the dome 2 is an interiorly threaded fitting 5 constructed to receive a safety valve of any suitable type engaged therein to relieve the tank car of interior pressure above a certain amount and safeguard the same from explosion.

The form of safety valve constituting the subject matter of my invention, which is engaged into the fitting 5, consists of a substantially cylindrical casing 6 which is exteriorly threaded for engagement with the fitting 5. Said casing 6 is provided with a depending or downwardly extending cylindrical guide portion 7 and with an inwardly directed shoulder 8 to form an abutment having a coiled compression spring 9 seated within the downwardly extending portion 7. The upper portion of the casing 6 is provided with an inner upwardly extending portion 10 which forms a cylinder for a piston type of valve 11 and is provided with outlet or exhaust ports 12 which open into a peripheral open channel surrounding the cylinder 10 formed by an integral, upwardly extending wall 13. Said shoulder 8 extends also inwardly sufficiently to form an abutment for the piston 11 to limit the same in its downward movement. Threaded or otherwise positively secured into said piston 11 is a stem or rod 14 which at its lower end has secured adjustably thereon in any suitable manner a spider 15 having a circular seat portion for the lower end of the coiled spring 9. Said spider, as shown, is held slidably on said rod 14 against displacement therefrom by nuts 16 and the adjustment of said nuts on the rod 14 determines the initial pressure, if any, on the under side of the piston 11 from within the tank car and against which said valve 11 must operate in opening. Said piston 11 is provided with one or more piston-sealing rings 17, and owing to the fact that said ports do not extend entirely around the inner cylinder 10, as shown in Figure 5, said piston ring or rings are prevented from springing outwardly from the piston rings grooves when passing or registering with said ports 12. Threaded or otherwise suitably engaged into the upper side of the piston 11 is a stem or rod 18, as shown, provided with a lock nut 19 and having an enlarged head or eye 20, which, for the lower position of the piston 11, rests upon the upper portion of a weather shield 21 which fits over and rests upon the cylinder 10 of the casing 6 and is provided with a depending peripheral flange 22 normally extending below the upper end of the outer wall 13 of said casing. Said stem 18, as shown, is provided with a series of indications or graduations which, as said stem is elevated upwardly through the hood or shield 21, indicate the position of the piston valve 11 and consequently the interior pressure within the tank car 1.

Said hood or shield 21 has formed integrally, or secured thereon, at one side, adjacent the manhole 4, a tongued extension 23 to engage into the forked end of a hinge member 24 and provided with a hinge pintle 25. Threaded or otherwise engaged into said hinged member 24 is a handle 26 and the manhole cover 4 is provided with a large plate or other suitable device 27 formed or secured rigidly thereon, or mounted for adjustment thereon if desired.

Said cylinder 10 of the casing 6 at its portion above the ports 12, as shown in Figures 3 and 5, has portions cut away at diametrically opposite points to form a curved or helical supporting surface 28 extending substantially, though not necessarily, 90 degrees around the cylinder on each side. Similarly, said hood or shield 21 is provided with two depending curved flanged portions 29 which fit complementarily into the cut-away portions of the cylinder 10 and by rotation of the hood 21 by means of the handle lever 26, serve to elevate the hood 21 upon the cam or helical surfaces 28 and thereby open the piston valve 11.

In the form of device shown in Figures 6 and 7 the construction of the safety valve is very similar, but the casing 6, instead of having its cut-away cylinder 10, is provided with a cylinder 30 having ports 31. Mounted to slide within said cylinder 30, instead of the piston 11, is a piston 32 provided with one or more piston rings 33 near its lower end and also provided with a plurality of groove segments 34 above the piston ring or rings. Said piston 32 is also provided with three vertical grooves 35, although the exact number may be varied, which extend downwardly from the upper surface and each communicates with one of the groove segments 34. Formed or secured on the interior of the cylinder 30 are lugs or projections 36 each normally engaged in one of the vertical grooves 35 to prevent rotational movements of piston 32 except when elevated to released position above the ports 31 and with the said projections registering with the groove segments 34. As in the previous construction described, a stem is secured into the upper portion of the piston 32 denoted by the reference numeral 37 and having a reries of graduations thereon to indicate by its elevation interior pressures within the tank car and the compression stress upon the spring 9 caused by elevation of the piston 32 for any reason whatsoever.

A head 38 is provided on the stem 37 and has a longitudinal slot 39 therein which registers with a horizontal slot 40 in a long lever or handle 41 and a pintle 42 is engaged through said slots. A hood or shield 43 is provided which is grooved on its inner surface to engage slidably around the upper edge of the cylinder 30 and said hood 43 is provided with an extension 44 which extends over the manhole cover 4 and also serves as a fulcrum for the lever 41 which is connectd thereto by a pivot bolt 45.

Figure 8 is a central vertical section through a modified form of device wherein the weatherproof hood 46 has fixed relation with the movable piston 11, through an integral or other stem or rod 47. Furthermore, said hood is provided with a pointer 48 to indicate pressures over a graduated scale marked on the periphery of the casing 6 by a series of circles or other means not shown but clearly understood.

Operation.

Access to the tank car 1 is afforded through the dome 2 by detachment of the manhole cover 4. The safety valve forming the subject matter of my invention is of a new type not only operating positively to relieve the pressure within the tank car at a predetermined point but preventing leakage thereby at all other lower pressures, and serves also as a means to prevent detachment of the manhole cover until the safety valve has been moved to release position and pressure within the tank car dissipated. Thus, accidents due to the manhole cover being blown out of the car prior to complete disconnection thereof are obviated.

In the form of device shown on Figures 1 to 5 inclusive the pressure at which the safety valve is designed to open completely is determined by the size of the coil spring 7 and also the adjustment of its retaining spider 15. Ordinarily, however, the spring 9 will be so constructed as to have substantially no initial stress thereon for the lower limit of movement of the piston 11 shown. When pressure augments within the tank car, the piston 11 is elevated against the compression of the spring 9, but leakage of the contents from the tank car cannot take place, as a positive seal over the ports 12 is provided by the piston ring which is in the lower extreme portion of the piston 11 for all positions of the piston except open position thereof, that is, above the ports 12. In the poppet valves used heretofore augmenting of the pressure within the tank has compressed the springs, thereby lessening the sealing pressure of the poppet valve upon its seat and leakage has occurred, which not only causes loss of the contents of the tank but also is a serious menace owing to the explosive mixture formed by the leaking gas with the surrounding air.

Opening movements of the safety valve for pressures lower than the predetermined relief pressure cause elevation of the upper piston stem 18 through the protector hood 21 and the graduations on said stem offer means of indication to an observer of interior pressures in the tank car. The device is so constructed that in order to detach the manhole cover 4 it is necessary to displace the handle 26 so that the manhole cover may be rotated and elevated and finally disconnected. Displacement of the handle 26 is performed manually by swinging the same counterclockwise, as shown in Figure 1, through an angle of substantially 90 degrees, although the particular angularity of movement may vary without departing from the principles of this invention. This rotational adjustment of the handle imposes the same rotational movement upon the hood 21 and its cam surfaces or projections 29 are caused to ride upwardly on the cams 28, causing elevation of the hood 21 and the consequent elevation of the piston 11 therewith to open position, so that if any pressure exists within the tank it is released before access to the manhole-cover for detachment is permitted. The hinge connection 25 for the handle 26 permits the same to swing downwardly on the dome 2 in the revolved position of the safety valve so as to form no obstacle and also relieve the safety valve from supporting the weight thereof. The safety valve, of course, is held in open position due to the cams 29 engaging over the upper straight edges of the cylinder 10 after the hood 21 has been revolved. When the manhole cover 4 has been replaced, the handle 26 is used to revolve the hood 21 in a clockwise direction, permitting the cams 29 to move downwardly into the cut-away portions of the cylinder 10 and lowering of the piston 11 to its lower, closed limit of movement.

In the construction shown in Figures 6 and 7, the extension 44 of the hood 43 normally projects over the manhole cover 4, preventing detachment thereof and accordingly it is necessary to revolve the same through an angle of substantially 45 degrees to permit detachment of the cover. Such adjustment, however, is prevented by the lugs 36 engaged in the upright grooves 35 of the piston 32. It is only possible to permit such adjustment to take place by first elevating the piston 32 into open position by means of the lever 41 which serves to move the piston upwardly past the ports 31 so that the groove segments 34 register with the lugs 36 and the rotational adjustment in a counter-clockwise direction before adjustment of the handle 41 and locking projection 44 for the manhole cover, is permitted. The piston 32 is then held elevated due to the engagement of the lugs 36 in the groove segments 34. Return of the safety valve to closed position is readily effected by revolving the handle 31 in a clockwise direction and permitting the piston 32 to be impelled downwardly by the spring 9 with the lugs 36 engaging within the vertical grooves 35 of the piston.

The connection of the lever 41 to the device to effect release and opening thereof does not affect the automatic operation of the valve against the spring 9, as the slot 39 permits elevation of the piston 32 without movement of the lever 41 and the stem 37 is thus utilized by means of its indications to signify pressures existing within the tank.

Further possibility of use of the construction is that of measuring the resistance of the spring 9 to determine the setting of the safety valve for release at a predetermined pressure. That is, a jack screw may be placed upon the dome to engage beneath the free end of the lever 41 with a suitable compression measuring instrument and the lever 41 elevated until the piston 32 has moved into open or released position. From the values of the compression measuring instrument and the lever lengths known, the compression upon the spring 9 may be determined and adjustments of the nuts 16 may be made to so position the spider 15 that the piston valve 32 opens under a predetermined pressure.

I am aware that numerous details of construction may be varied through a wide range without departing from the principles of this invention, and I therefore do not purpose limiting the patent granted otherwise than necessitated by the prior art.

Claims.

1. A safety valve for a tank car adapted to be mounted adjacent to the manhole cover of the tank car, and means on the safety valve preventing detachment of the manhole cover without movement of the safety valve into a released position.

2. The combination with a tank car and its manhole cover of a safety valve, and means forming a part of the safety valve preventing detachment of the manhole cover except when said safety valve is in open position.

3. A combination with a tank car and means giving access to the interior thereof, of a safety valve, and mechanism forming part of the safety valve preventing opening of said means without prior opening of the safety valve.

4. The combination with a tank car and the manhole cover therefor of a safety valve and mechanisms forming part of the safety valve projecting over the manhole cover to prevent detachment thereof except by opening of the said safety valve.

5. The combination with a tank car and means giving access to the interior thereof of a relief valve and mechanism forming part thereof operating to prevent opening of said means without first moving said valve to relief position.

In testimony whereof I have hereunto subscribed my name in the presence of two subscribing witnesses.

CLIFFORD LISTON BURNHAM.

Witnesses:
  LE ROY D. KILEY,
  EARL M. HARDINE.